(12) United States Patent
Ross

(10) Patent No.: US 9,706,874 B1
(45) Date of Patent: Jul. 18, 2017

(54) HOT TEA AND COFFEE PRESS CONVERTIBLE INTO AN ICED TEA AND COFFEE PRESS INCLUDING SPECIAL HOT LIQUID DRINKING CONTAINER

(71) Applicant: Gary Ross, Oxnard, CA (US)

(72) Inventor: Gary Ross, Oxnard, CA (US)

( * ) Notice: Subject to any disclaimer, the term of this patent is extended or adjusted under 35 U.S.C. 154(b) by 237 days.

(21) Appl. No.: 13/780,565

(22) Filed: Feb. 28, 2013

(51) Int. Cl.
*A47J 31/18* (2006.01)
*B65D 81/38* (2006.01)

(52) U.S. Cl.
CPC .............. *A47J 31/18* (2013.01); *B65D 81/38* (2013.01)

(58) Field of Classification Search
CPC ........ A23G 91/045; A47J 31/18; B65D 81/38
USPC ......................................... 99/297, 302 P, 323
See application file for complete search history.

(56) References Cited

U.S. PATENT DOCUMENTS

| | | | | | |
|---|---|---|---|---|---|
| 3,927,608 | A | * | 12/1975 | Doyel ..................... | A47J 31/20 99/287 |
| 4,309,872 | A | * | 1/1982 | Raser et al. .................... | 62/517 |
| 4,365,544 | A | * | 12/1982 | Howitt ..................... | A47J 31/20 99/297 |
| 4,650,583 | A | * | 3/1987 | Bondanini .............. | A47J 31/20 210/474 |
| 5,618,570 | A | * | 4/1997 | Banks et al. .................. | 426/435 |
| 7,213,507 | B2 | * | 5/2007 | Glucksman ............. | A47J 31/20 99/287 |
| D611,752 | S | * | 3/2010 | Ross .............................. | D7/300 |
| 7,849,784 | B2 | * | 12/2010 | Adler ...................... | A47J 31/02 99/287 |
| 2009/0229472 | A1 | * | 9/2009 | Ferrara, Jr. ..................... | 99/323 |
| 2010/0224078 | A1 | * | 9/2010 | Khalifa .......................... | 99/323 |
| 2010/0319549 | A1 | * | 12/2010 | Kelty et al. ..................... | 99/297 |
| 2012/0037355 | A1 | * | 2/2012 | Bishop et al. ................ | 166/119 |
| 2012/0097042 | A1 | * | 4/2012 | Lin ................................ | 99/297 |
| 2012/0328750 | A1 | * | 12/2012 | Giordano ...................... | 426/433 |

FOREIGN PATENT DOCUMENTS

SU          1151486      *   4/1985

* cited by examiner

*Primary Examiner* — David Angwin
*Assistant Examiner* — Frederick Calvetti
(74) *Attorney, Agent, or Firm* — Thomas I. Rozsa

(57) ABSTRACT

A press for brewing hot coffee and hot tea by compressing tea leaves or coffee grinds to the bottom in the drink container or vessel with a structural filter that both has an improved sealing member from the filter to vessel and includes a filter screen and most importantly, a movable flapper valve which opens under pressure as the apparatus is pushed through the water towards the coffee grinds or tea leaves to expose a filter so that the coffee grinds or tea leaves at the bottom of the container seep into the water to create hot brewed coffee or tea. For coffee, the coffee beans are ground and coffee grinds are used. For tea, tea leaves are used.

20 Claims, 17 Drawing Sheets

Side View of a Flap

HOT TEA AND COFFEE PRESS CONVERTIBLE INTO AN ICED TEA AND COFFEE PRESS INCLUDING SPECIAL HOT LIQUID DRINKING CONTAINER

BACKGROUND OF THE INVENTION

1. Field of the Invention

The field of the present invention relates to coffee and tea makers known generally as a french press. The process involves inserting tea leaves or coffee grinds into a container and adding hot water. The press is used to compress the coffee grinds or tea leaves. The press always includes a filter to push sediment to the bottom to make the coffee or tea. The present invention also relates to the field of drinking containers to drink hot liquids 2. Description of the Prior Art The present inventor obtained a design patent for "APPARATUS TO BREW COFFEE AND TEA", Pat. No. D611,752 issued on Mar. 16, 2010. Over the years, the present inventor, Gary Ross, has invented significant improvements to his patented invention. To the best of the present inventor's knowledge, nobody has conceived of the improvements as described and claimed in the present application.

The present inventor has also invented a unique drinking container to drink the hot liquid after tea or coffee has been brewed.

SUMMARY OF THE INVENTION

The present invention is an improved tea and coffee press apparatus for brewing hot tea and hot coffee and converting the apparatus to a press apparatus for creating iced tea and iced coffee.

It is an object of the present invention to provide a press for brewing hot coffee and hot tea by compressing tea leaves or coffee grinds to the bottom in the drink container or vessel with a structural filter that both has an improved sealing member from the filter to vessel and includes a filter screen and most importantly, a movable flapper valve which opens under pressure as the apparatus is pushed through the water towards the coffee grinds or tea leaves to expose a filter so that the coffee grinds or tea leaves at the bottom of the container seep into the water to create hot brewed coffee or tea. For coffee, the coffee beans are ground and coffee grinds are used. For tea, tea leaves are used.

It is a further object of the present invention to include a top seal adjacent to the top of a single stiff leg or flexible legs, and if there is a multiplicity of openings around the circumferential edge of the top seal, it will allow drinking anywhere on the top without having to look at the top. This seal will also provide more heat retention to keep the beverage hotter than if the drinking container had no lid.

It is an additional object of the present invention to remove the top seal and brew hot water to brew hot tea or hot coffee but designed to facilitate room to add ice in the drinking vessel for iced tea or iced coffee.

It is another object of the present invention to have a single non-flexible leg attached to the flapper valve assembly to brew tea or coffee. This embodiment includes a single pole.

It is further object of the present invention to have a spaced apart pair of non-flexible legs attached to the flapper valve assembly to brew tea or coffee In all embodiment, the flapper valve can also be referred to as a check valve.

It is an additional object of the present invention to provide a special drinking container by which hot liquid can be consumed in the container due to an insulated double wall which permits the container be held in a bare hand and consumed through a single walled top sidewall.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
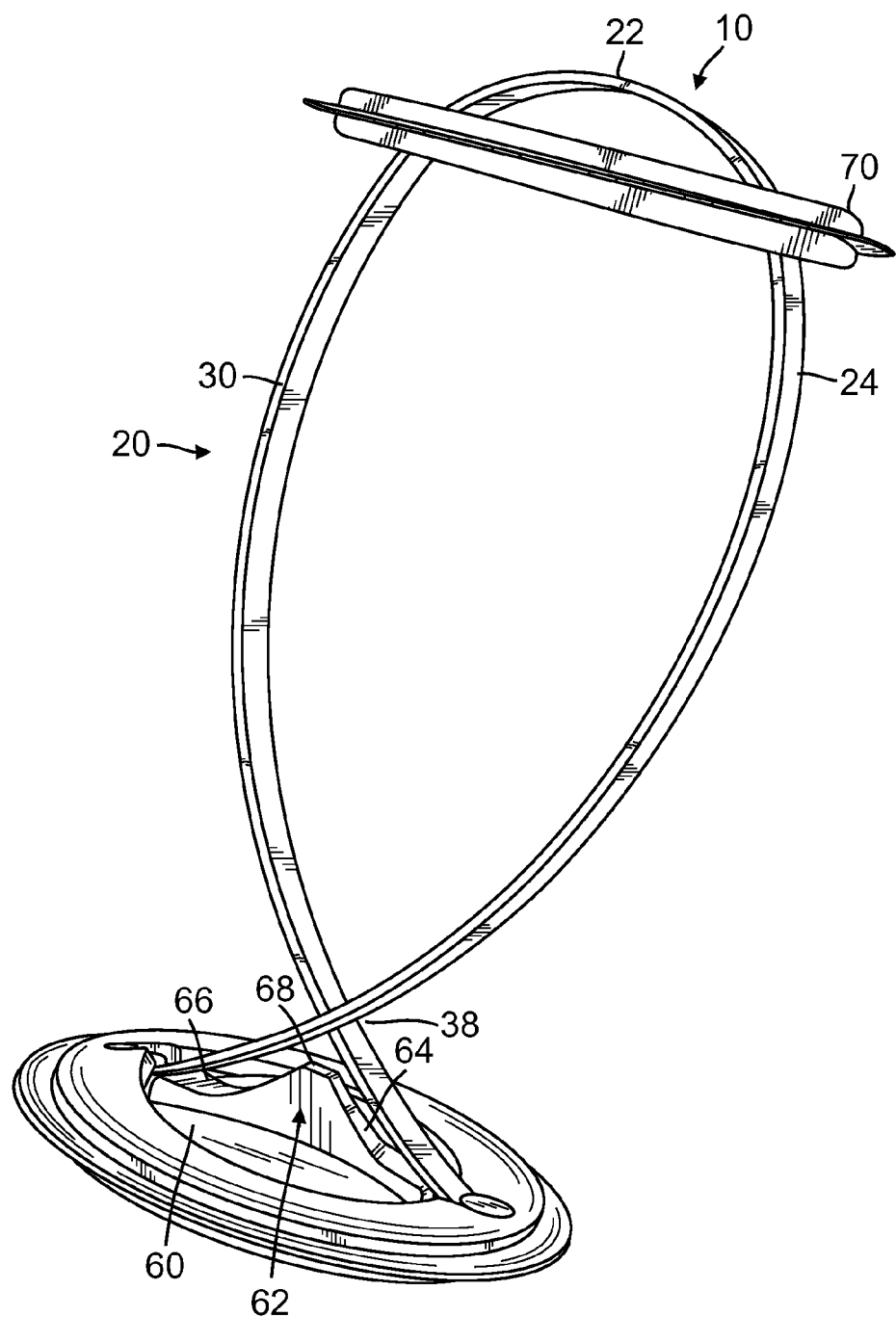
FIG. 1 is a side perspective view of a first embodiment of the present invention apparatus to brew hot coffee and to brew hot tea through a press method of compressing coffee beans or tea leaves in hot water.
Figure 2:
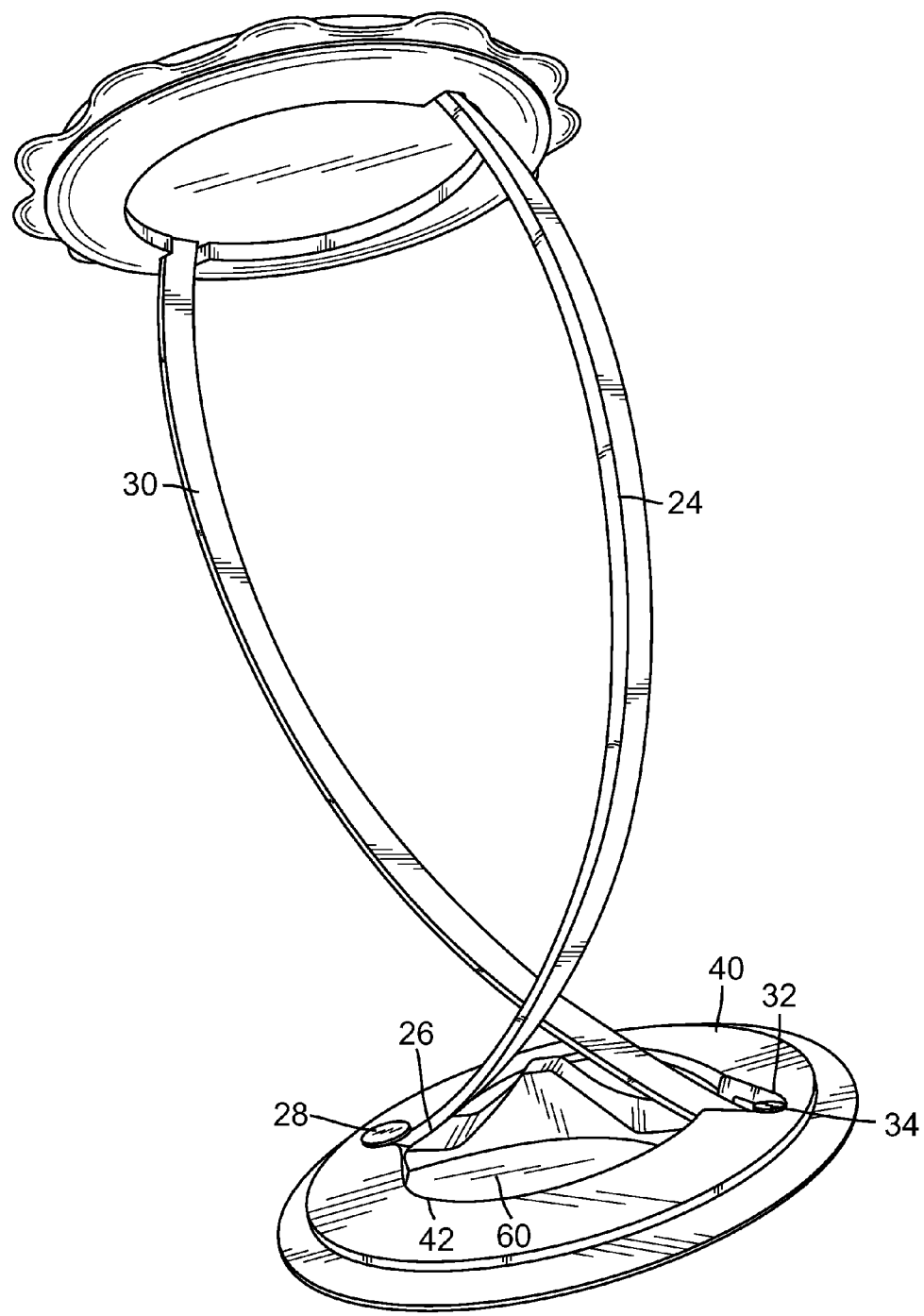
FIG. 2 is a top perspective view of a first embodiment of the present invention apparatus to brew hot coffee and to brew hot tea through a press method of compressing coffee beans or tea leaves in hot water, also illustrating the bottom of the upper sealing member.
Figure 3:
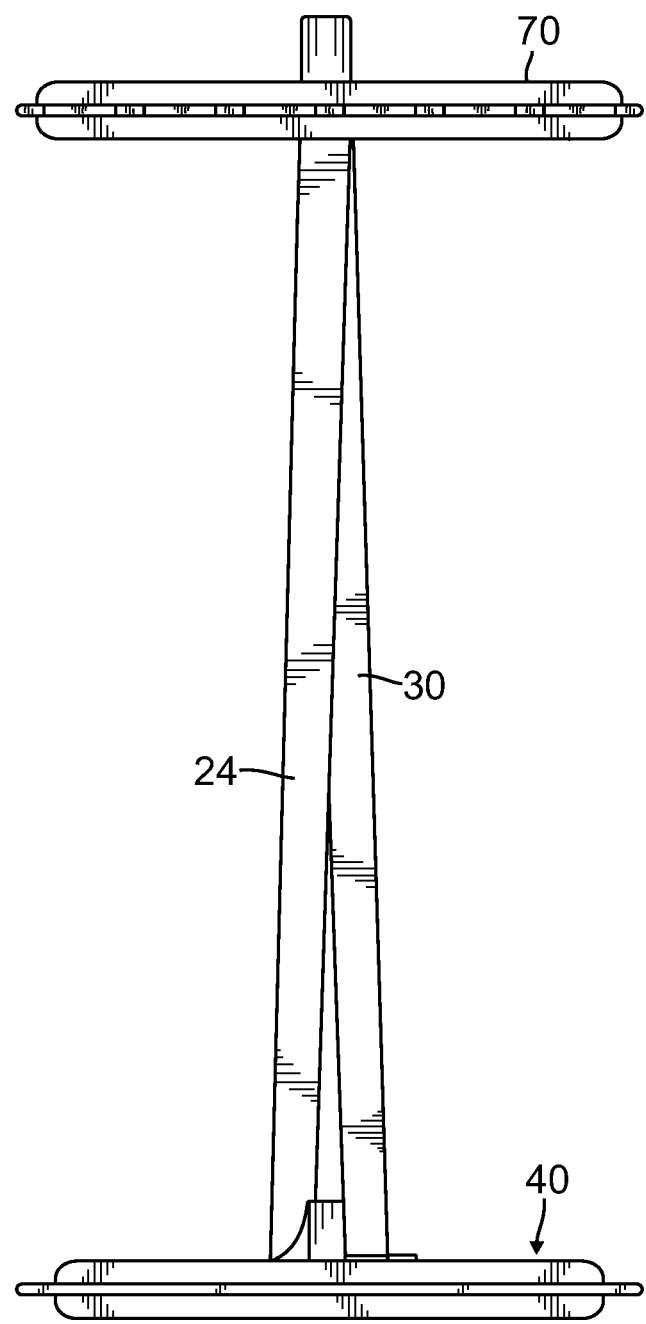
FIG. 3 is a left side view of a first embodiment of the present invention apparatus to brew hot coffee and to brew hot tea through a press method of compressing coffee beans or tea leaves in hot water.
Figure 4:
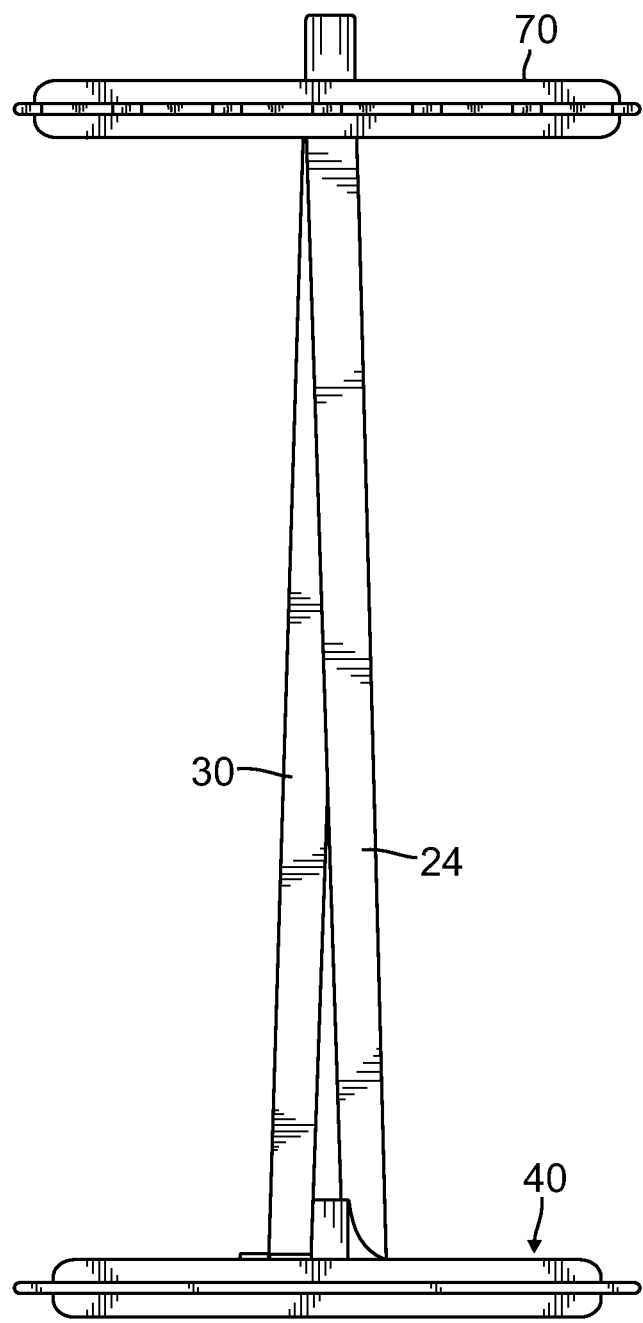
FIG. 4 is a right side view of a first embodiment of the present invention apparatus to brew hot coffee and to brew hot tea through a press method of compressing coffee beans or tea leaves in hot water.
Figure 5:
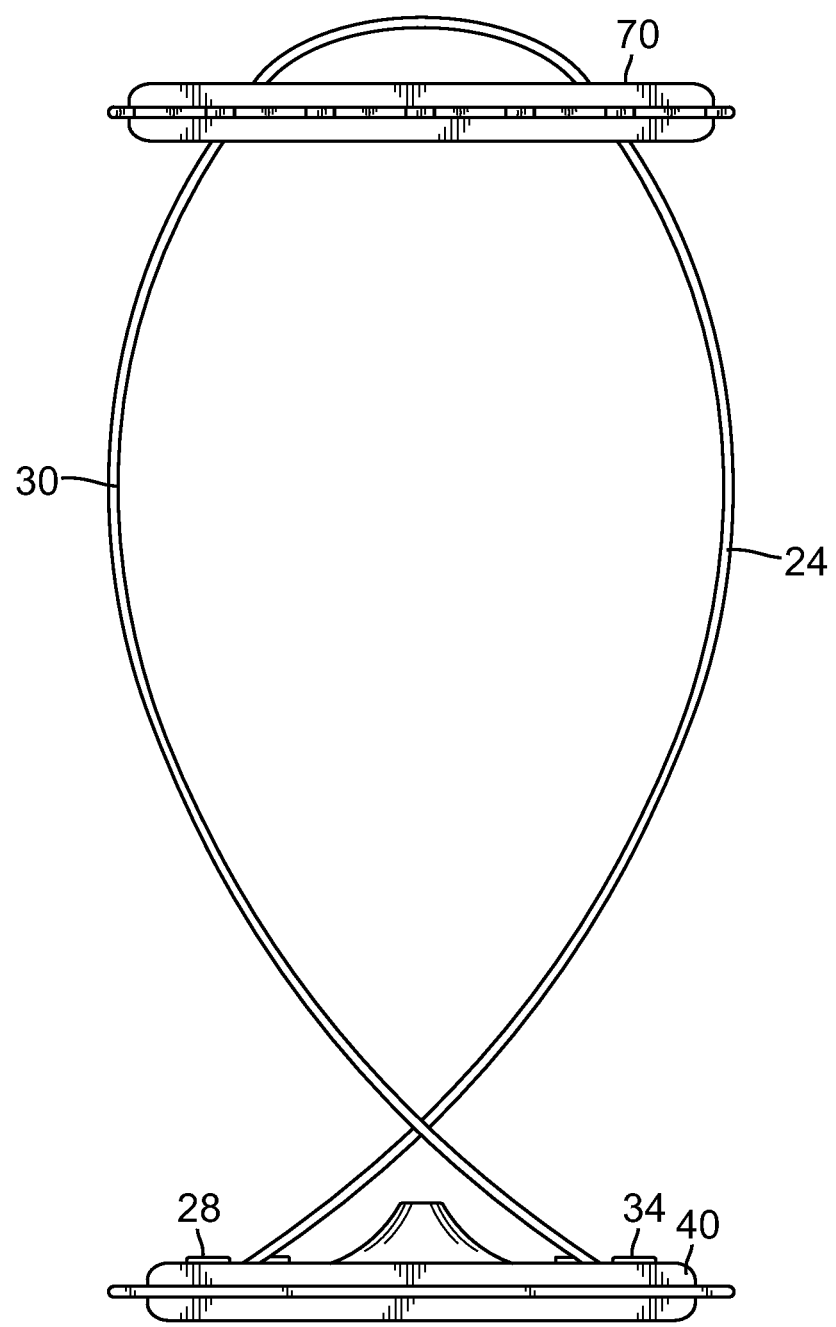
FIG. 5 is a front elevational view of a first embodiment of the present invention apparatus to brew hot coffee and to brew hot tea through a press method of compressing coffee beans or tea leaves in hot water.
Figure 6:
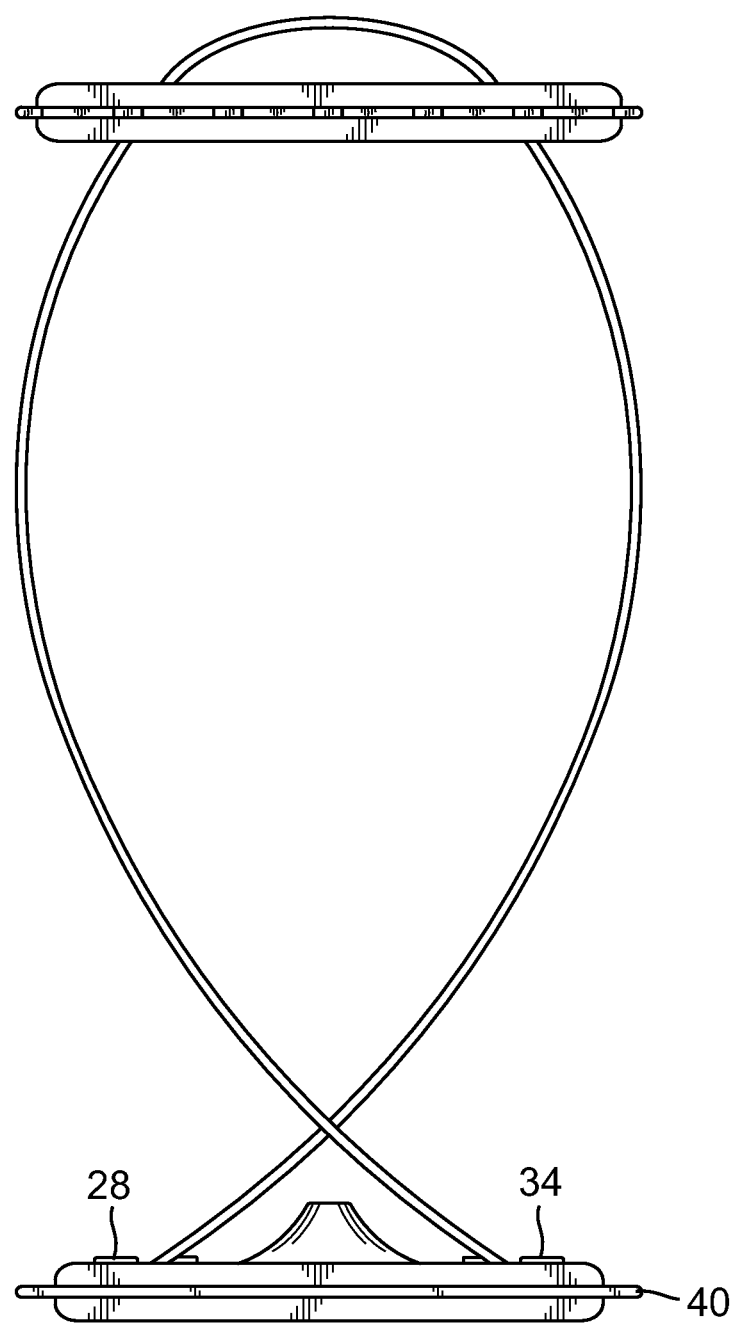
FIG. 6 is a rear elevational view of a first embodiment of the present invention apparatus to brew hot coffee and to brew hot tea through a press method of compressing coffee beans or tea leaves in hot water.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 10. there is illustrated the first embodiment of the present invention apparatus to brew hot coffee and to brew hot tea through a press method of compressing ground coffee beans or tea leaves in hot water. The apparatus 10 comprises a flexible spring leg 20 with a rounded top portion 22 and a first leg section 24 and a second leg section 30 which cross each other at location 38 to provide a spring effect. The spring legs 24 and 30 will contact the sides of the vessel and this is important to provide stability when pressing. The spring also allows a good and easy way to locate the flapper valve where the legs terminate at the bottom filter. The flexible spring leg 20 and spring legs 24 and 30 are made from material selected from the group consisting of metal such as aluminum, steel and titanium and non-metal material such as carbon fiber and flexible elastomeric plastic.

First leg section 24 has a distal end 26 which is affixed to the fixed soft flexible press stopper 40 by affixation means such as a rivet 28. Second leg section 30 has a distal end 32 which is affixed to the soft flexible stopper 40 by affixation means such as a rivet 34. The soft flexible press stopper 40 is circular with a central opening 42 which surrounds a fixed filter 50 which is affixed to the soft flexible press stopper 40. The soft flexible press stopper can be made of material selected from the group consisting of silicon and rubber. The fixed filter is preferably made of metal but can be made out of plastic and flexible member. Movably resting on the fixed filter 50 is a movable flapper valve 60 having a round base sized to fit within the opening 42 of soft flexible press stopper 40 and rest over filter 50. The movable flapper valve 60 has a raised section 62 having a first arcuate top 64, a second arcuate top 66 which join at a flat top section 68 which is aligned with the crossed location 38 of first leg section 24 and second leg section 30. The movable flapper valve can be made out of material selected from the group consisting of silicone and rubber.

Figure 7:
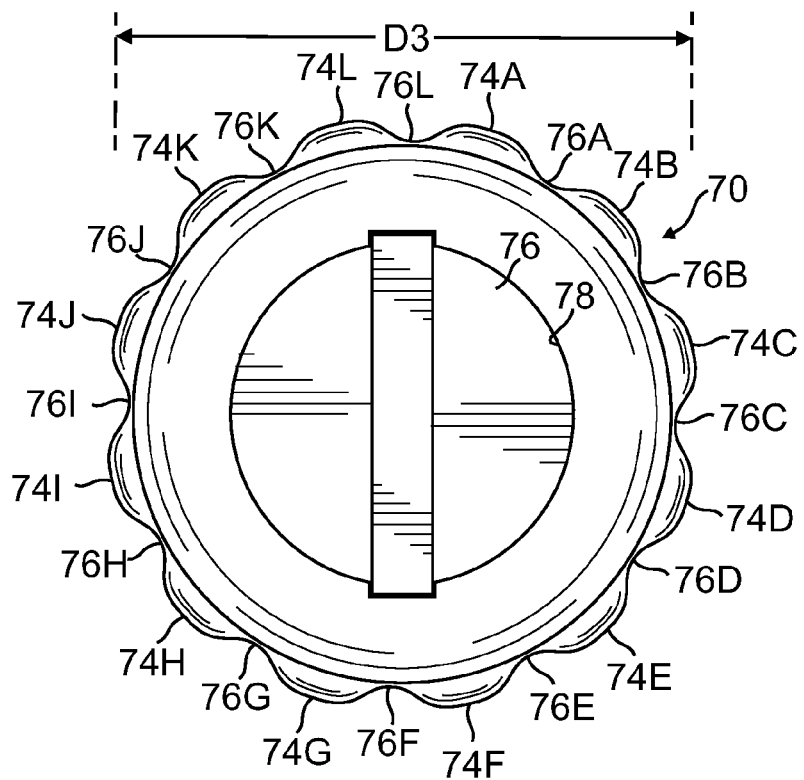
FIG. 7 is a top plan view of a first embodiment of the present invention apparatus to brew hot coffee and to brew hot tea through a press method of compressing coffee beans or tea leaves in hot water.
Figure 8:
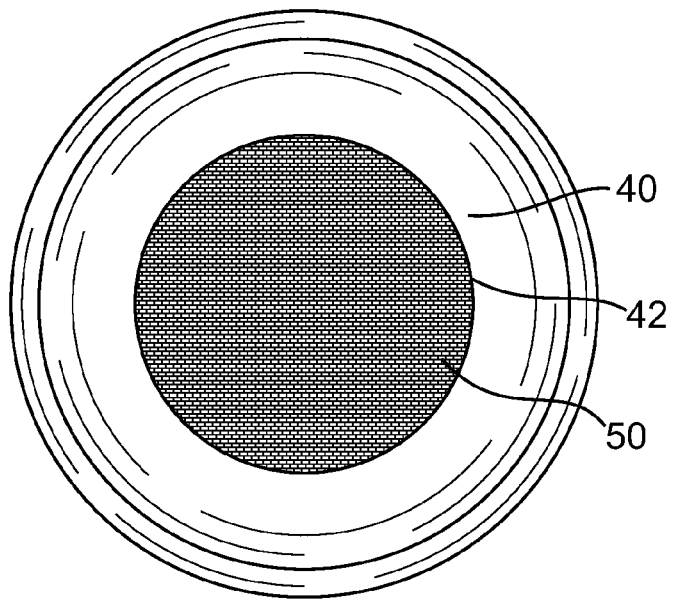
FIG. 8 is a bottom plan view of a first embodiment of the present invention apparatus to brew hot coffee and to brew hot tea through a press method of compressing coffee beans or tea leaves in hot water.
Figure 9:
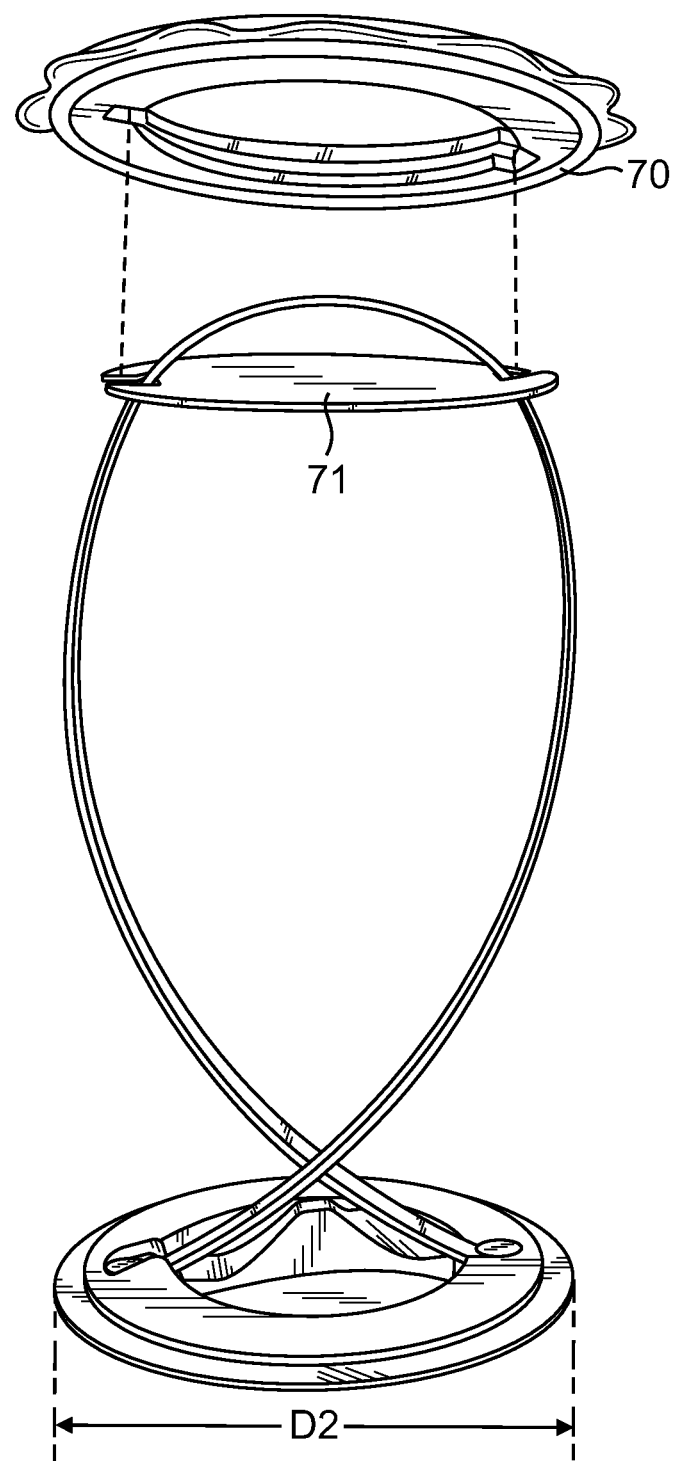
FIG. 9 is an exploded view of the apparatus with the top seal removed to show the plate which supports the press fit top seal onto the flexible legs.

Referring to FIGS. 7 and 9, affixed adjacent the top portion 22 of spring legs 20 is a flexible sealing member 70 supported by a plate 71. The flexible sealing member 70 can have a smooth circumference or a flowered circumference 72 with spaced apart petals such as 12 petals 74A, 74B,74C, 74D, 74E, 74F, 74G, 74H, 74I, 74J, 74K and 74L. The flexible sealing member 70 has a central opening 76 with an interior circumference 78 by which the flexible sealing member 70 is press fit retained onto leg sections 24 and 30 adjacent leg top section 22 which acts as a handle. The flexible sealing member can be made out of material selected from the group consisting of silicone and rubber.

Figure 10:
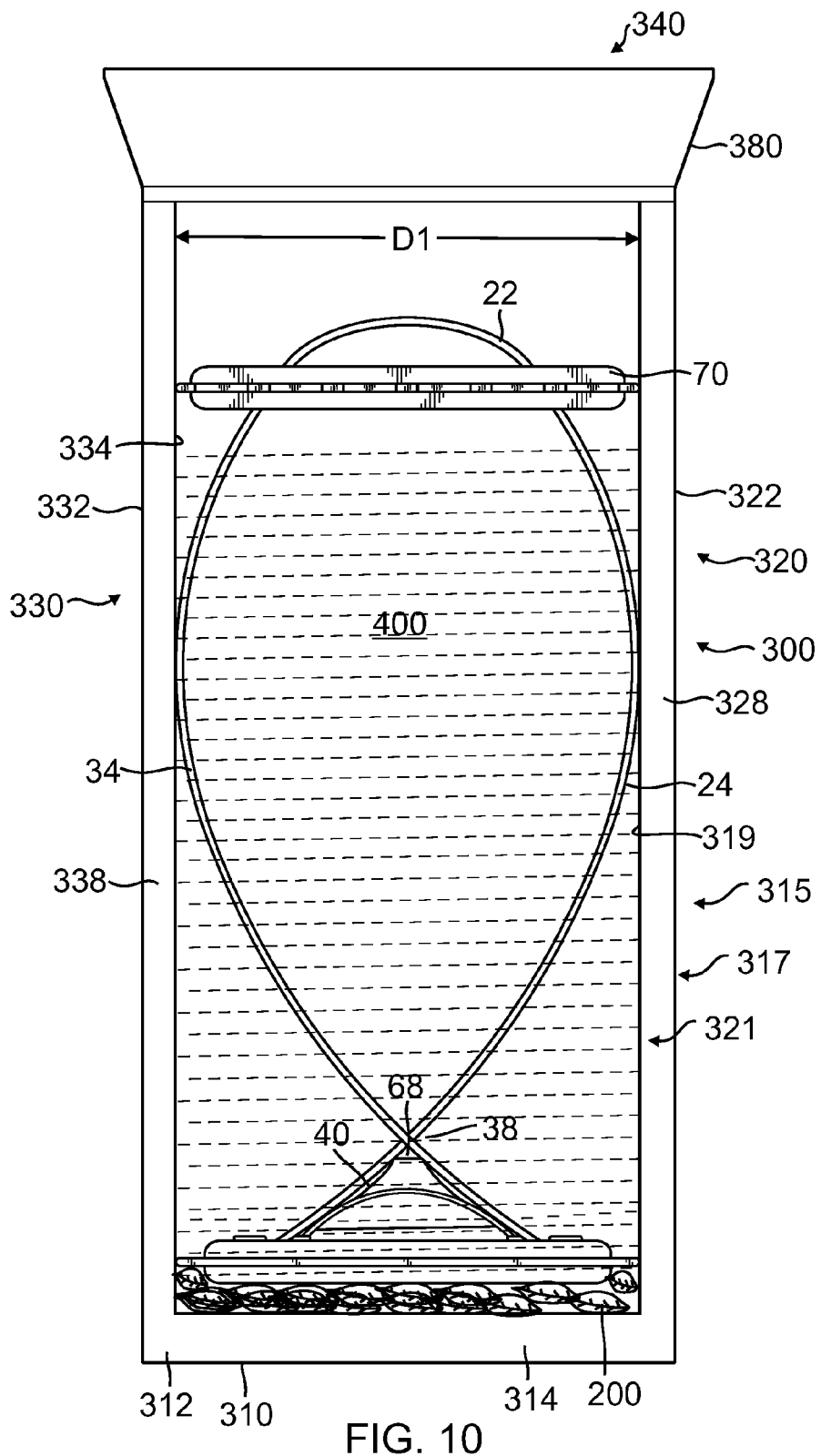
FIG. 10 is a side view of the present invention apparatus to brew hot coffee and to brew hot tea through a press method with the apparatus inserted into the present invention special drinking container with tea leaves or coffee grinds compressed at the bottom of the glass and brewed tea in the portion of the glass above the flapper valve assembly, illustrating the flapper valve in the moved and opened condition to respectively permit tea or coffee to flow through the filter during the brewing process.
Figure 11:
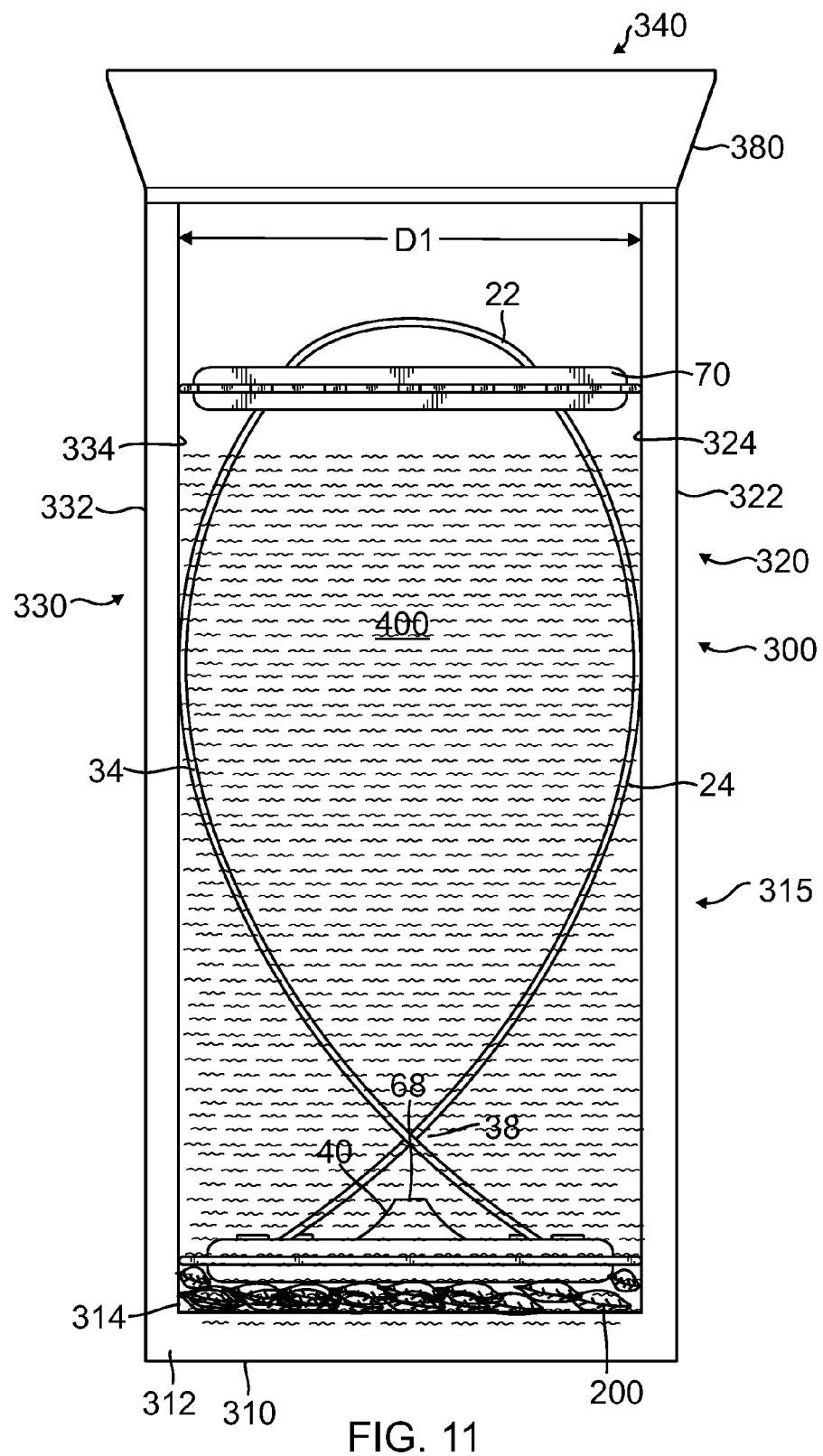
FIG. 11 is a side view of the present invention apparatus to brew hot coffee and to brew hot tea through a press method with the apparatus inserted into the present invention special drinking container with tea leaves or coffee grinds compressed at the bottom of the glass and brewed tea or brewed coffee in the portion of the glass above the flapper valve assembly after the tea or coffee is brewed.

Referring to FIGS. 10 and 11, a multiplicity of tea leaves or coffee grinds from ground coffee beans 200 is placed in a drinking container or vessel 300 having a bottom wall 310, a sidewall 315 having oppositely disposed first sidewall section 320, second sidewall section 330 and an open top 340. Bottom wall 310 has an exterior surface 312 and an interior surface 314. First sidewall section 320 has an exterior surface 322 and an interior surface 324. Second sidewall section 330 has an exterior surface 332 and an interior surface 334. The interior surfaces 314, 324 and 334 surround an interior chamber 350 having an interior diameter "D1" from interior sidewall surfaces 324 to interior sidewall surface 334.

Soft flexible press stopper 40 has an outer diameter "D2" which is sized to be press fit against interior diameter "D1". Flexible sealing member 70 has an outer diameter "D3" which is sized to be press fit against interior diameter "D1".

In operation, after the multiplicity of tea leaves or coffee grinds 200 is placed into the interior chamber 350 of drinking container or vessel 300 so that the tea leaves or coffee grinds 200 rest on the interior surface 314 of bottom surface 310, the chamber 350 is filled with hot water 400. The apparatus 10 is inserted into the interior chamber 350 and pushed down so that spring legs 324 and 330 cause the bottom surface 41 of fixed soft flexible press stopper 40 to compress the tea leaves or coffee grinds 200. The diameter "D2" is slightly smaller than the diameter "D1" so the fixed soft flexible press stopper 40 seals off the tea leaves or coffee grinds from the hot water. The pressure of the fixed soft flexible press stopper 40 causes tea or coffee to flow through filter 50 and movable flapper value 60 moves upwardly toward the crossing point 38 of spring legs 24 and 30 and flat top 66 comes in contact with the crossing point 38 to prevent the movable flapper valve 60 from further rising in the water, but the movement creates an opening above the filter 50 so that hot water is immersed with tea or coffee. After the downward pressure on the apparatus is released, the movable flapper valve 60 returns to its position above filter 50. The filter can be made out of material selected from the group consisting of metal such as aluminum, steel and titanium or plastic or polycarbonate or flexible mesh material.

The flexible sealing member 70 prevents hot water 400 from flowing out of the interior chamber 350 since the diameter "D3" is slightly smaller than the diameter "D1" to create a top seal. The openings 76A, 76B, 76C, 76D, 76E, 76F, 76G, 76H, 76I, 76J, 76K and 76L between the petals 74A, 74B, 74C, 74D, 74E, 74F, 74G, 74H, 74I, 74J, 74K and 74L permit the hot tea 410 to be sipped through the top opening 340 of drinking container or vessel 300.

FIGS. 10 and 11 also illustrate the unique drinking container 300 of the present invention. The drinking container or vessel 300 has a bottom wall 310, a sidewall 315 having oppositely disposed first sidewall section 320, second sidewall section 330 and an open top 340. Bottom wall 310 has an exterior surface 312 and an interior surface 314 with surround an insulating air channel 316. First sidewall section 320 has an exterior surface 322 and an interior surface 324 which surround an insulating air channel 328. Second sidewall section 330 has an exterior surface 332 and an interior surface 334 which surround an insulating air channel 338. In effect the sidewall 315 has a combined exterior surface 317 and interior surface 319 which surround an insulating air channel 321, forming a double wall. As a result, the drinking container 300 can be held in one hand because the insulating double wall 315 provides insulation from hot liquid 400 within the interior chamber 350. The top 340 has a single wall section 380 through which the hot liquid 400 can be consumed. The double wall insulated body sidewall 315 and single wall drinking top 380 are unique. The top 380 can also be double walled with an exterior wall and an interior wall surrounded by an air cannel. The bottom can also be a single wall.

Figure 12:
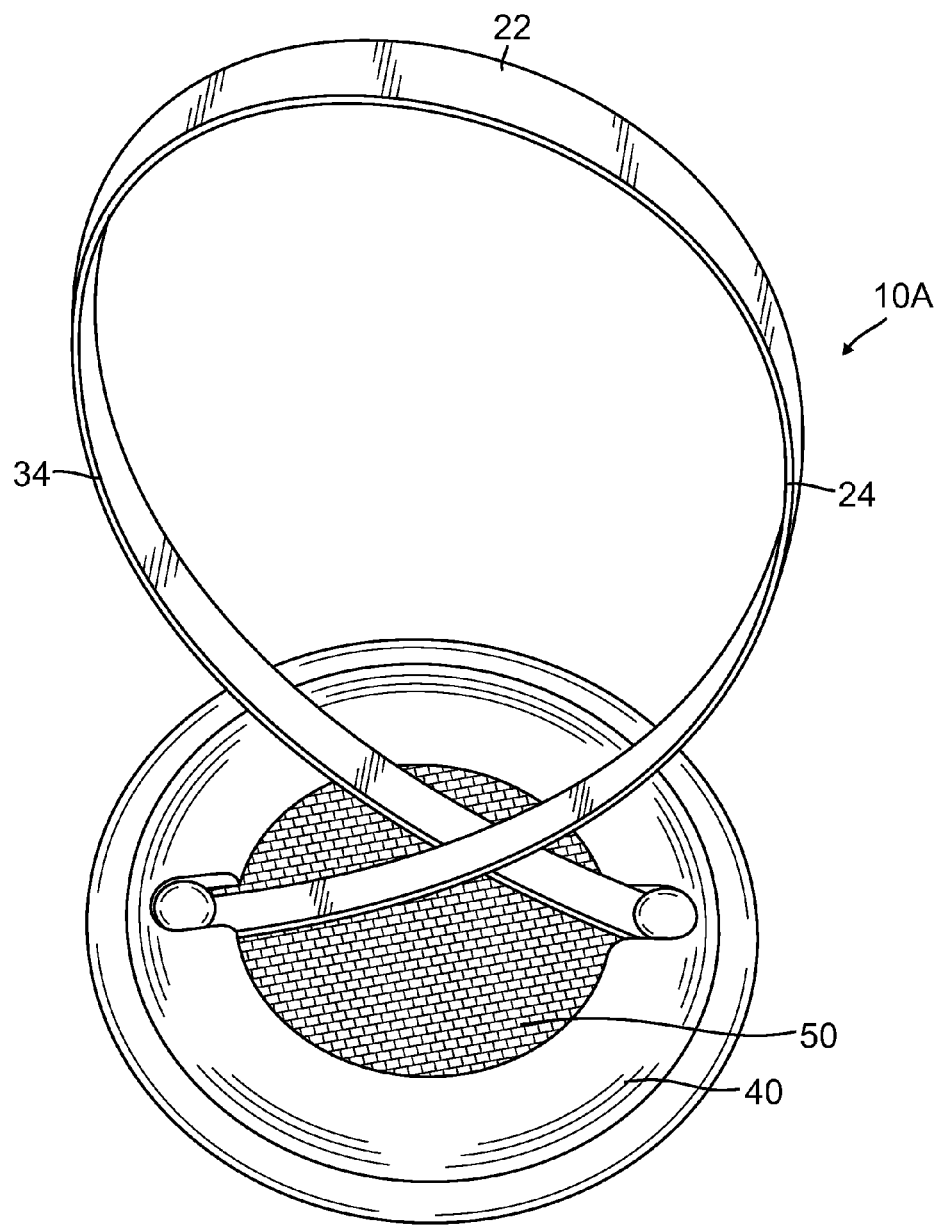
FIG. 12 is a side perspective view of the double cross-leg assembly affixed to a flexible silicone fixed press member with a filter retained within the silicone fixed press member and having the flapper valve removed.
Figure 13:
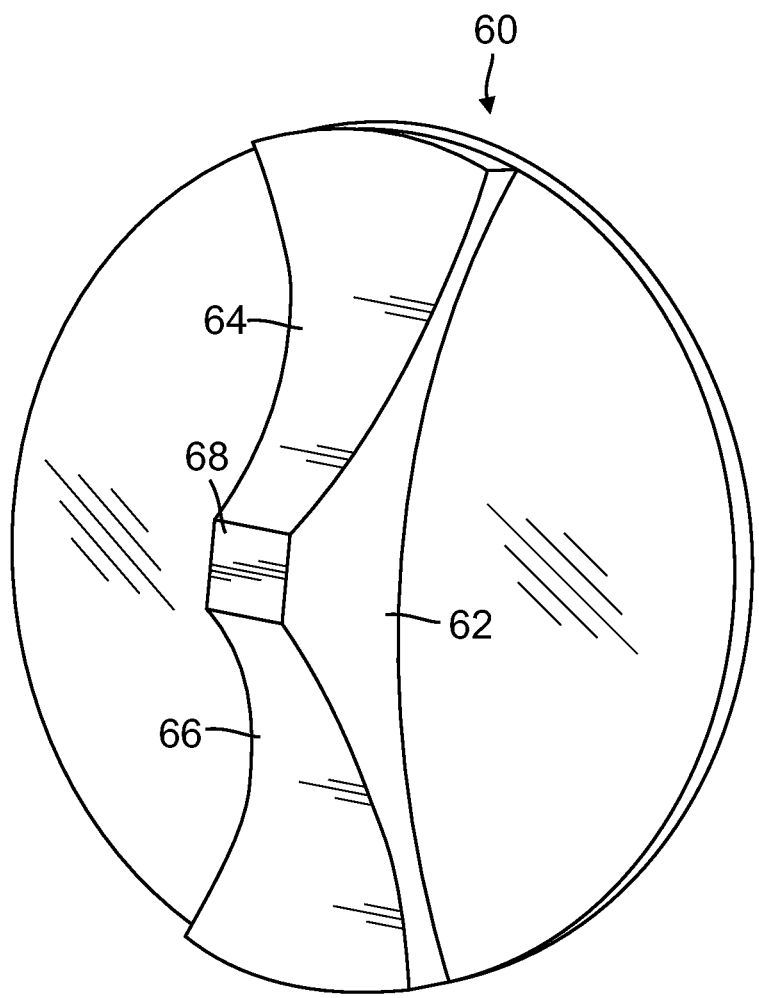
FIG. 13 is a top perspective view of a first embodiment of a flapper valve.
Figure 14:
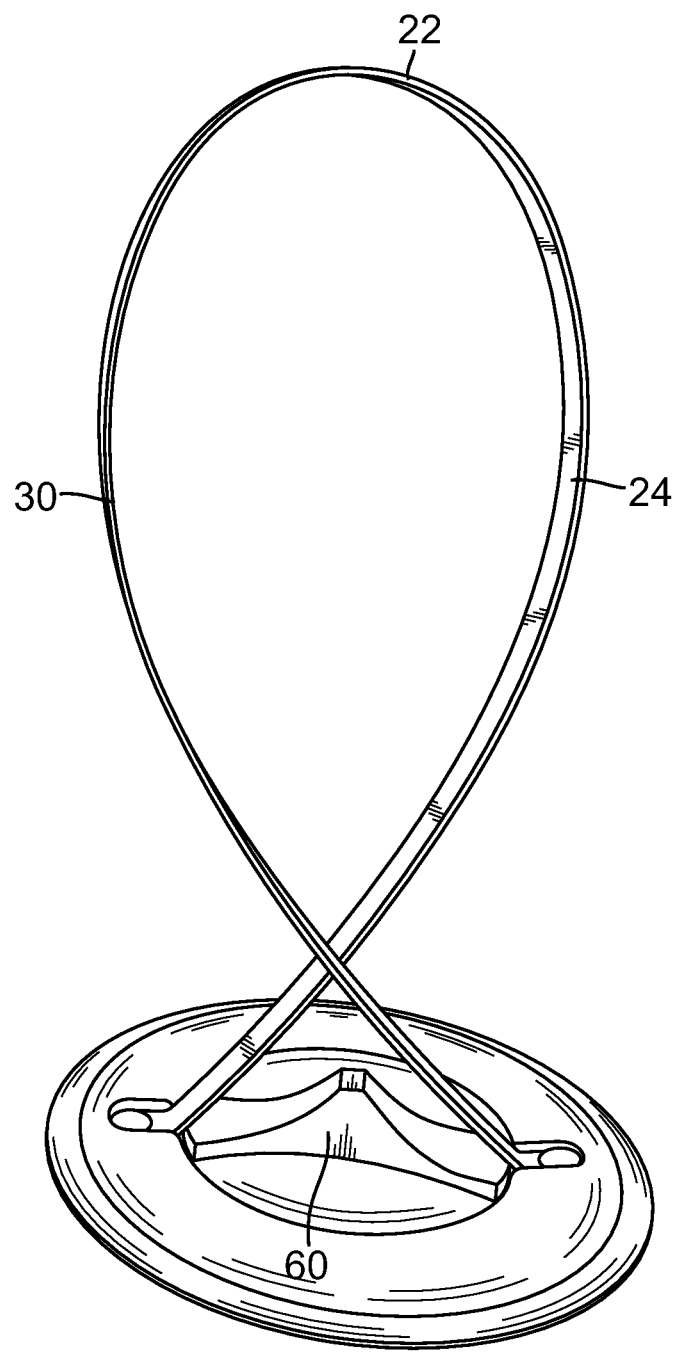
FIG. 14 is a side perspective view of the flexile legs affixed to a press seal with the flapper valve in the center of the press seal but with the top seal removed.
Figure 15:
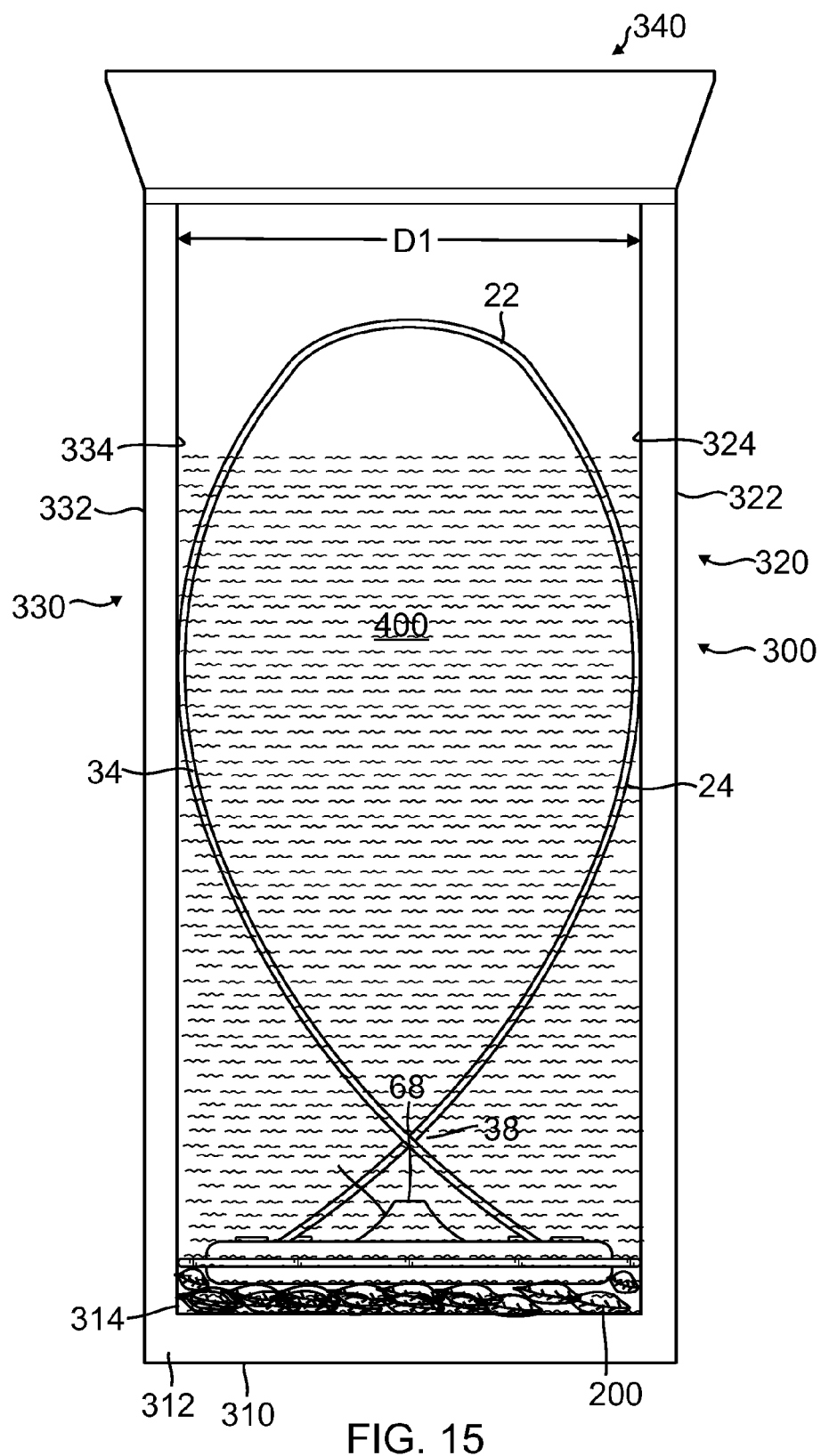
FIG. 15 is a side perspective view of the flexible legs illustrated in FIG. 14 for a variation on the first embodiment of the present invention apparatus to brew coffee and to brew tea through a press method of compressing coffee beans or tea leaves in hot water, but with the top seal removed to enable ice and sugar to be inserted in the present invention special drinking container.

Referring to FIGS. 12 through 14, in an alternative embodiment the upper flexible sealing member 70 is removed. The tea leaves or coffee grind 200 are placed into the chamber 350 and then hot water is added and used to brew the tea or coffee. Iced tea or iced coffee is made if enough room is left in the drinking container 300 to add ice to neutralize the hot brew. The user can also add sugar. The removal of the top filter allows easy access to add more sugar and ice so that iced tea or iced coffee can be consumed directly from the drinking container 300. The apparatus 10A is pressed down into the interior chamber 350. In operation, after the multiplicity of tea leaves or coffee grinds 200 is placed into the interior chamber 350 of drinking container or vessel 300 so that the tea leaves or coffee grinds 200 rest on the interior surface 314 of bottom surface 310, the chamber 350 is filled with hot water 430. The apparatus 10A is inserted into the interior chamber 350 and pushed down so that spring legs 324 and 330 cause the bottom surface 41 of fixed soft flexible press stopper 40 to compress the tea leaves or coffee grinds 200. The diameter "D2" is slightly smaller than the diameter "D1" so the fixed soft flexible press stopper 40 seals off the tea leaves or coffee grinds from the hot water 430. The pressure of the fixed soft flexible press stopper 40 causes tea or coffee to flow through filter 50 and movable flapper valve 60 moves upwardly toward the crossing point 38 of spring legs 24 and 30 and the flat top 66 comes in contact with the crossing point 38 to prevent the movable flapper valve 60 from further rising in the water, but the movement creates an opening above the filter 50 so that hot water is immersed with tea or coffee. After the downward pressure on the apparatus is released, the movable flapper valve 60 returns to its position above filter 50. Since the top 340 is open, ice can be placed into the interior chamber 350 to make iced tea or iced coffee.

Figure 16:
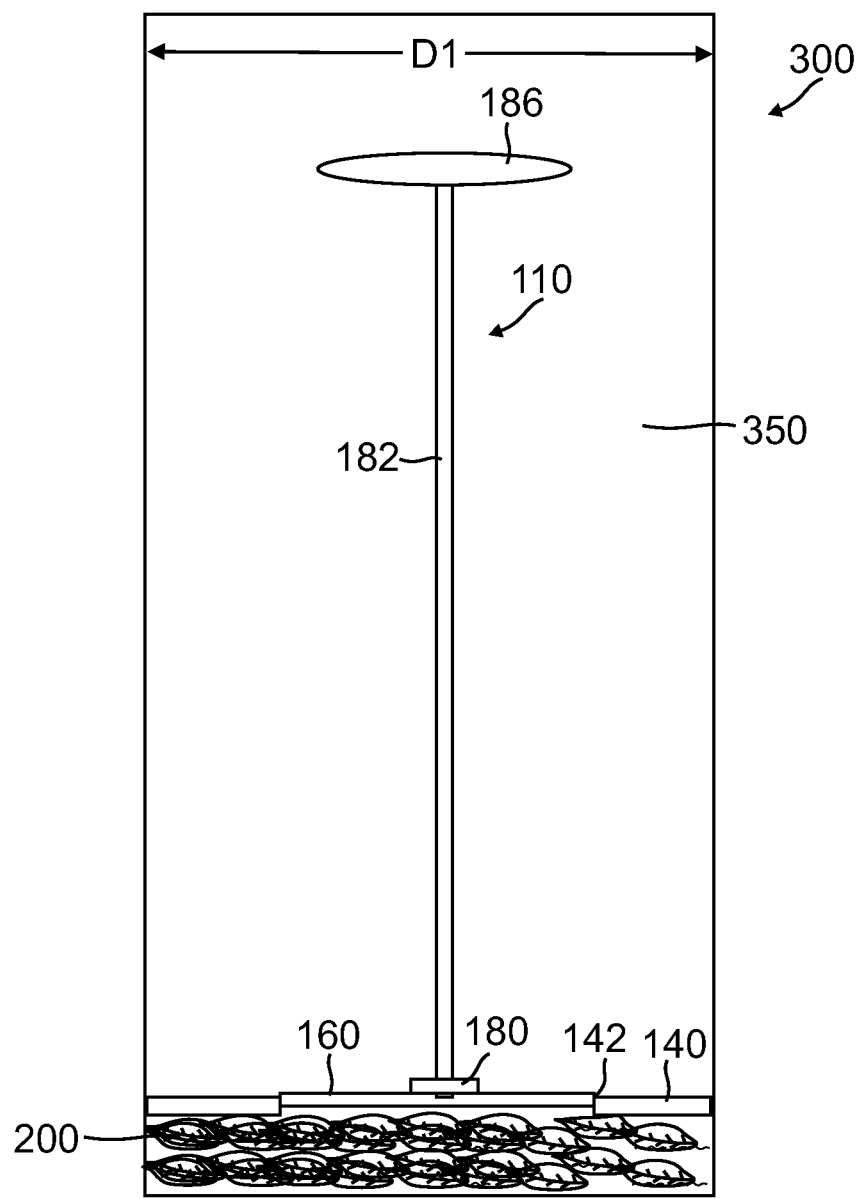
FIG. 16 is a side perspective view of an alternative embodiment of the present invention apparatus to brew hot coffee and to brew hot tea through a press method of compressing coffee beans or tea leaves in hot water, with a single pole leg affixed to a variation on the flapper valve assembly illustrated in FIG. 18.
Figure 17:
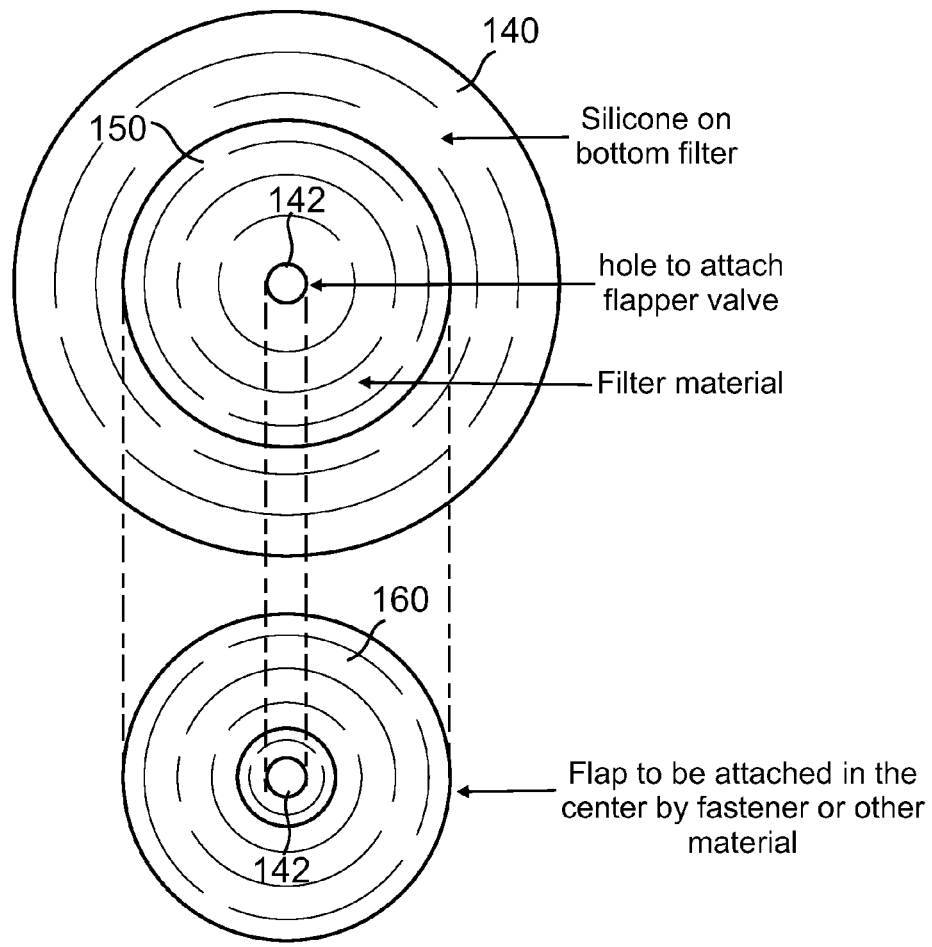
FIG. 17 is a separated top plan view of the fixed silicone ring and metal filter and the flapper valve used with the alternative embodiment of the present invention.
Figure 18:
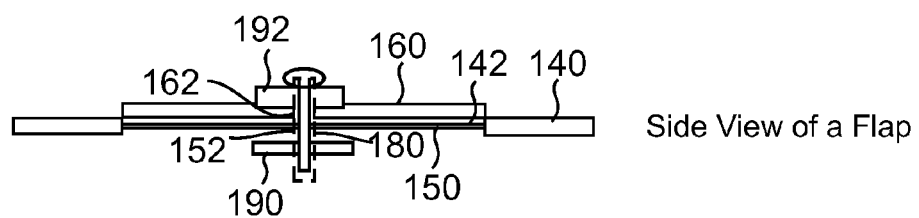
FIG. 18 is a side view of the assembled fixed silicone ring and filter with a flat flapper valve affixed to a rivet which can be affixed to the bottom of a single presser rod illustrated in FIG. 16.

An alternative embodiment is illustrated in FIGS. 16 to 18. A soft flexible press stopper 140 is circular with a central opening 142 which surrounds a fixed filter 150 which is affixed to the soft flexible press stopper 140. The filter 150 includes a central opening 152. The fixed filter 150 is preferably made of metal. Movably resting on the fixed filter 150 is a flat movable flapper valve 160 having a round base sized to fit within the opening 142 of soft flexible press stopper 140 and rest over filter 150. The movable flapper valve 160 has a central opening 162. A threaded shaft 180 or rivet extends through a first thread washer or nut 190 positioned below filter 250, extends through opening 152 in filter 150, extends through opening 162 in flat movable flapper valve 160 and a second threaded washer or nut 192 resting above flat movable flapper valve 160. The threaded shaft 180 extends to and is connected to an elongated shaft 182 terminating in a round handle 186 for the complete apparatus 110.

In this embodiment, the flapper valve 160 functions the same as the previous flapper valve 50 but is fixed to the center of filter 150. For this embodiment, the filter 150 must be a structural filter made from a hard material such as stainless steel and have many perforations in the filter 150 so it acts as a filter. In this embodiment, the flapper valve 160 having memory will lay flat on the filter 150 shutting off contact of the hot water with the tea leaves or coffee grinds but allows the tea or coffee to percolate through the filter 150 when it is brewing. In this embodiment, the single rod with the flapper valve at the bottom more easily allows different size drinking containers as the spring legs 24 and 30 are not required to hold down the flapper valve 150.

In operation, after the multiplicity of tea leaves or coffee grinds 200 are placed into the interior chamber 350 of drinking container or vessel 300 so that the tea leaves or coffee 200 rest on the interior surface 314 of bottom surface 310, the chamber 350 is filled with hot water 440. The apparatus 110 is inserted into the interior chamber 350 and pushed down so that shaft 186 and its lower section 182 cause the bottom surface 141 of fixed soft flexible press stopper 140 to compress the tea leaves or coffee grinds 200. The diameter "D4" is slightly smaller than the diameter "D1" so the fixed soft flexible press stopper 140 seals off the tea leaves or coffee grinds from the hot water. The pressure of the fixed soft flexible press stopper 140 causes the movable flapper valve 160 to move upwardly to open filter 150. Upward movement of the movable flapper valve 160 is stopped by second nut 192. With the upward movement of the movable flapper valve 160, the filter 150 is opened and tea or coffee flows through filter 150 and movable flapper value 160 moves upwardly but is restrained in movement by nut 192. The movement of the flapper valve 160 creates an opening above the filter 150 so that hot water is immersed with tea or coffee. After the downward pressure on the apparatus 110 is released, the movable flapper valve 160 returns to its position above filter 150. This creates hot tea or coffee. Since the top 340 is open, ice can be placed into the interior chamber 350 to make iced tea or iced coffee.

Figure 19:
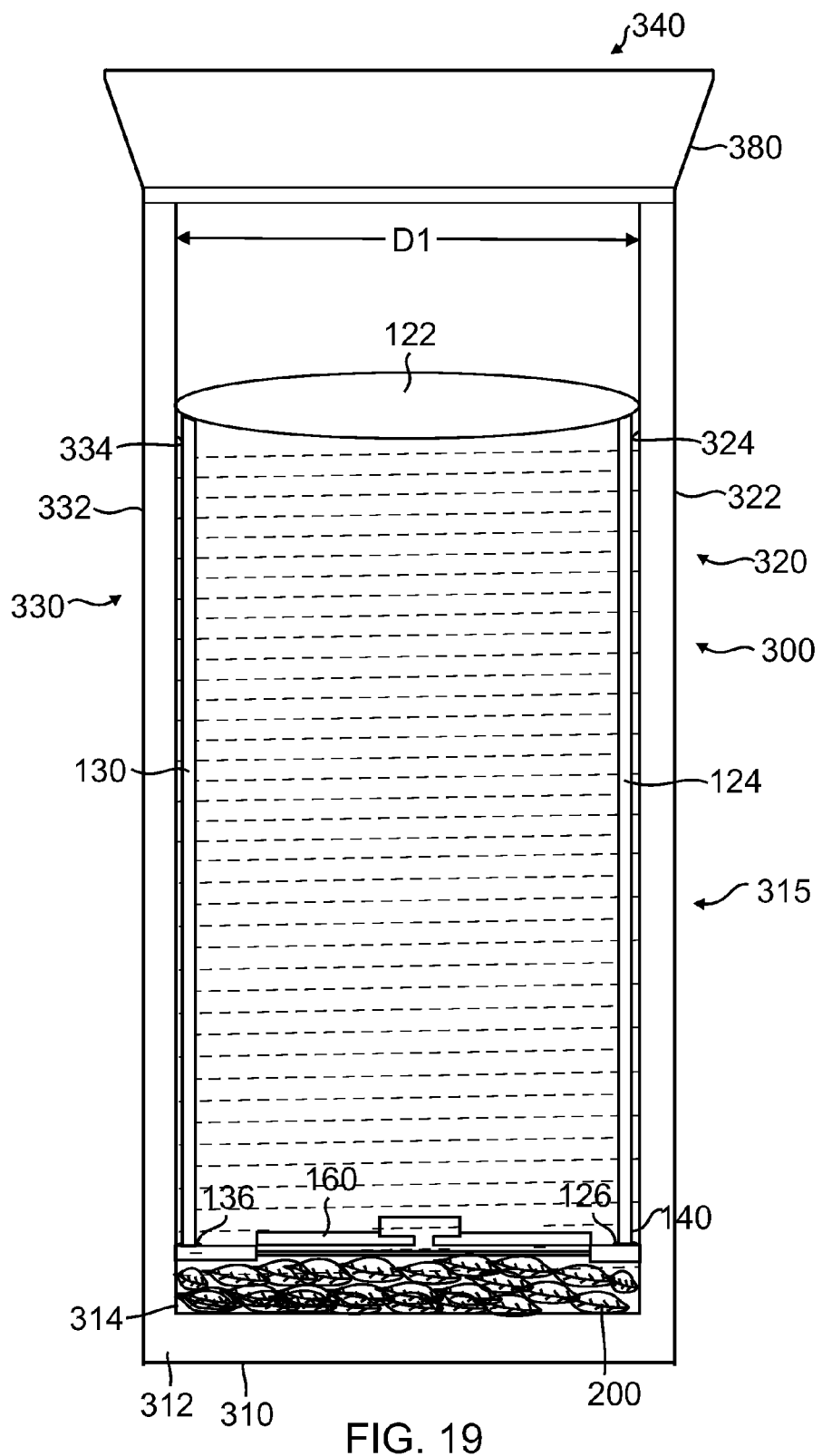
FIG. 19 is a side perspective view of another alternative embodiment of the present invention with a double fixed pole attached to a flexible stopper seal and flat valve assembly as illustrated in FIG. 18 and including the present invention special drinking container.

FIG. 19 is a variation on the embodiment illustrated in FIGS. 16 through 18. The flapper valve assembly is the same but instead of a single shaft 186, there is a double shaft 124 and 130 extending to larger handle 280, each double shaft 124 and 130 respectively affixed to stopper 140 by affixation means such as a rivet.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to brew tea or coffee, comprising:
   a. a flexible spring leg having a rounded top portion and a first spring leg section and a second leg spring leg section which cross each other at a location to provide a spring effect, the first and second spring leg sections contacting oppositely disposed sections of an interior sidewall of a drinking container when the apparatus is inserted into the drinking container;
   b. the first spring leg section having a distal end which is affixed to a fixed soft flexible press stopper by a rivet, the second flexible spring leg section having a distal end which is affixed to the fixed soft flexible stopper by a rivet, the soft flexible press stopper is circular with a central opening which surrounds a fixed filter which is affixed to the soft flexible press stopper;
   c. movably resting on the fixed filter is a movable flapper valve having a round base sized to fit within the opening of soft flexible press stopper and resting over the filter, the movable flapper valve having a raised section having a first arcuate top, a second arcuate top which join at a flat top section which is aligned with the crossed location of first and second spring leg sections;
   d. affixed adjacent a top portion of the first and second spring legs sections is a flexible sealing member supported by a plate, the flexible sealing member having a flowered circumference with a multiplicity of spaced apart petals with a liquid flow opening between each respective petal, the flexible sealing member having a central opening with an interior circumference by which the flexible sealing member is slide able and press fit retained onto the first and second spring leg sections adjacent the rounded top portion of the spring leg which serves as a handle; and
   e. the drinking container having a bottom wall, a sidewall and an open top, the bottom wall having an exterior surface and an interior surface, the sidewall having an exterior surface and an interior surface, the bottom and sidewall interior surfaces surround an interior chamber having an interior diameter from oppositely disposed sections of the interior sidewall surfaces, the fixed soft flexible press stopper having a press fit outer diameter relative the interior diameter of the drinking container, the diameter of the flowered circumference of the flexible sealing member press fit relative to the interior diameter of the drinking container;
   f. whereby, the apparatus as defined in elements a, b, c, d and e is used in conjunction with a multiplicity of tea leaves or coffee grinds wherein the tea leaves or coffee grinds are placed into the interior chamber of the drinking container so that the tea leaves or coffee grinds rest on the interior surface of the bottom wall, the interior chamber is filled with hot water, the apparatus is inserted into the interior chamber and pushed down so that first and second spring leg sections cause a bottom surface of the fixed soft flexible press stopper to compress the tea leaves or coffee grinds and because the diameter of the soft flexible press stopper is press fit retained against the interior diameter of the drinking container, the fixed soft flexible press stopper seals off the tea leaves or coffee grinds from the hot water and the pressure of the fixed soft flexible press stopper causes tea or coffee to flow through the filter and the movable flapper value moves toward the crossing point of the first and second spring leg sections and the flat top of the movable flapper valve comes in contact with the crossing point of the first and second spring leg sections to prevent the movable flapper valve from further rising in the water, but the movement creates an opening above the filter so that the hot water is immersed with tea or coffee, and after the downward pressure on the apparatus is released, the movable flapper valve returns to its position above filter and hot tea or hot coffee is brewed, the flexible sealing member prevents hot water from flowing out of the interior chamber since its diameter is also press fit retained against the interior diameter of the drinking container to thereby create a top seal, the respective openings between the multiplicity of petals permits hot tea or hot coffee to be sipped through the top opening of drinking container.

2. The apparatus in accordance with claim 1, further comprising:
   a. the flexible spring leg including the top portion, first spring leg section and second spring leg section are made out of material selected from the group consisting of metal including aluminum, steel and titanium, and non-metal material including carbon fiber, flexible elastomer and plastic.

3. The apparatus in accordance with claim 1, further comprising:
   a. the soft flexible stopper is made out of material selected from the group consisting of silicone and rubber.

4. The apparatus in accordance with claim 1, further comprising:
   a. the flexible sealing member is made out of material selected from the group consisting of silicone and rubber.

5. The apparatus in accordance with claim 1, further comprising:
   a. the movable flapper valve is made out of material selected from the group consisting of silicone and rubber.

6. An apparatus to brew tea or coffee, comprising:
   a. a flexible spring leg having a rounded top portion and a first spring leg section and a second leg spring leg section which cross each other at a location to provide a spring effect, the first and second spring leg sections contacting oppositely disposed sections of an interior sidewall of a drinking container when the apparatus is inserted into the drinking container;
   b. the first spring leg section having a distal end which is affixed to a soft flexible press stopper by a rivet, the second flexible spring leg section having a distal end which is affixed to the soft flexible stopper by a rivet, the soft flexible press stopper is circular with a central opening which surrounds a fixed filter which is affixed to the soft flexible press stopper;
   c. movably resting on the fixed filter is a movable flapper valve having a round base sized to fit within the opening of soft flexible press stopper and resting over the filter, the movable flapper valve having a raised section aligned with the crossed location of first and second spring leg sections;

d. affixed adjacent a top portion of the first and second spring leg sections is a flexible sealing member, the flexible sealing member having a flowered circumference with a multiplicity of spaced apart petals with a liquid flow opening between each respective petal, the flexible sealing member having a central opening with an interior circumference by which the flexible sealing member is slide able and press fit retained onto the first and second spring leg sections adjacent the rounded top portion of the spring leg which serves as a handle; and e. the drinking container having a bottom wall, a sidewall and an open top, the bottom wall having an exterior surface and an interior surface, the sidewall having an exterior surface and an interior surface, the bottom and sidewall interior surfaces surround an interior chamber having an interior diameter from oppositely disposed sections of the interior sidewall surfaces, the soft flexible press stopper having a press fit outer diameter relative the interior diameter of the drinking container; container, the diameter of the flowered circumference of the flexible sealing member press fit relative to the interior diameter of the drinking container;

f. whereby, the apparatus as defined in elements a, b, c, d and e is used in conjunction with a multiplicity of tea leaves or coffee grinds wherein the tea leaves or coffee grinds are placed into the interior chamber of the drinking container so that the tea leaves or coffee grinds rest on the interior surface of the bottom wall, the interior chamber is filled with hot water, the apparatus is inserted into the interior chamber and pushed down so that first and second spring leg sections cause a bottom surface of the soft flexible press stopper to compress the tea leaves or coffee grinds and because the diameter of the soft flexible press stopper is press fit retained against the interior diameter of the drinking container, the soft flexible press stopper seals off the tea leaves or coffee grinds from the hot water and the pressure of the soft flexible press stopper causes tea or coffee to flow through the filter and the movable flapper value moves toward the crossing point of the first and second spring leg sections and the raised section of the movable flapper valve comes in contact with the crossing point of the first and second spring leg sections to prevent the movable flapper valve from further rising in the water, but the movement creates an opening above the filter so that the hot water is immersed with tea or coffee, and after the downward pressure on the apparatus is released, the movable flapper valve returns to its position above filter and hot tea or hot coffee is brewed, the flexible sealing member prevents hot water from flowing out of the interior chamber since its diameter is also press fit retained against the interior diameter of the drinking container to thereby create a top seal, the respective openings between the multiplicity of petals permits hot tea or hot coffee to be sipped through the top opening of drinking container.

7. The apparatus in accordance with claim 6, further comprising:

a. the flexible spring leg including the top portion first spring leg section and second spring leg section are made out of material selected from the group consisting of metal including aluminum, steel and titanium, and non-metal material including carbon fiber, flexible elastomer and plastic.

8. The apparatus in accordance with claim 6, further comprising:

a. the soft flexible stopper is made out of material selected from the group consisting of silicone and rubber.

9. The apparatus in accordance with claim 6, further comprising:

a. the flexible sealing member is made out of material selected from the group consisting of silicone and rubber.

10. The apparatus in accordance with claim 6, further comprising:

a. the movable flapper valve is made out of material selected from the group consisting of silicone and rubber.

11. An apparatus to brew tea or coffee, comprising:

a. a flexible spring leg having a rounded top portion which serves as a handle and a first spring leg section and a second leg spring leg section which cross each other at a location to provide a spring effect, the first and second spring leg sections contacting oppositely disposed sections of an interior sidewall of a drinking container when the apparatus is inserted into the drinking container;

b. the first spring leg section having a distal end which is affixed to a soft flexible press stopper by a rivet, the second flexible spring leg section having a distal end which is affixed to the soft flexible stopper by a rivet, the soft flexible press stopper is circular with a central opening which surrounds a fixed filter which is affixed to the soft flexible press stopper;

c. movably resting on the fixed filter is a movable flapper valve having a round base sized to fit within the opening of soft flexible press stopper and resting over the filter, the movable flapper valve having a raised section having a first arcuate top, a second arcuate top which join at a flat top section which is aligned with the crossed location of first and second spring leg sections; and d. slide able on and affixed adjacent a top portion of the first and second spring leg sections is a flexible sealing member having a multiplicity of liquid flow openings along its outer circumference;

e. the drinking container having a bottom wall, a sidewall and an open top, the bottom wall having an exterior surface and an interior surface, the sidewall having an exterior surface and an interior surface, the bottom and sidewall interior surfaces surround an interior chamber having an interior diameter from oppositely disposed sections of the interior sidewall surfaces, the soft flexible press stopper having a press fit outer diameter relative the interior diameter of the drinking container, the outer circumference of the flexible sealing member press fit relative to the interior diameter of the drinking container;

f. whereby, the apparatus as defined in elements a, b, c, and d is used in conjunction with a multiplicity of tea leaves or coffee grinds wherein the tea leaves or coffee grinds are placed into the interior chamber of the drinking container so that the tea leaves or coffee grinds rest on the interior surface of the bottom wall, the interior chamber is filled with hot water, the apparatus is inserted into the interior chamber and pushed down so that first and second spring leg sections cause a bottom surface of the fixed soft flexible press stopper to compress the tea leaves or coffee grinds and because the diameter of the soft flexible press stopper is press fit retained against the interior diameter of the drinking container, the soft flexible press stopper seals off the tea leaves or coffee grinds from the hot water and the pressure of the fixed soft flexible press stopper causes tea or coffee to flow through the filter and the movable flapper value moves toward the crossing point of the first and second spring leg sections and the flat top of the flapper valve comes in contact with the crossing point of the first and second spring leg sections to prevent the movable flapper valve from further rising in the water, but the movement creates an opening above the filter so that the hot water is immersed with tea or coffee, and after the downward pressure on the apparatus is released, the movable flapper valve returns to its position above filter and hot tea or hot coffee is brewed.

12. The apparatus in accordance with claim 11, further comprising:
  a. adding ice to the hot water respectively converts the brewed tea or brewed coffee into iced tea or iced coffee.

13. The apparatus in accordance with claim 11, further comprising:
  a. the flexible spring leg including the top portion first spring leg section and second spring leg section are made out of material selected from the group consisting of metal including aluminum, steel and titanium, and non-metal material including carbon fiber, flexible elastomer and plastic.

14. The apparatus in accordance with claim 11, further comprising:
  a. the soft flexible stopper is made out of material selected from the group consisting of silicone and rubber.

15. The apparatus in accordance with claim 11, further comprising:
  a. the movable flapper valve is made out of material selected from the group consisting of silicone and rubber.

16. An apparatus to brew tea or coffee, comprising:
  a. a flexible spring leg having a rounded top portion which serves as a handle and a first spring leg section and a second leg spring leg section which cross each other at a location to provide a spring effect, the first and second spring leg sections contacting oppositely disposed sections of an interior sidewall of a drinking container when the apparatus is inserted into the drinking container;
  b. the first spring leg section having a distal end which is affixed to a fixed soft flexible press stopper, the second flexible spring leg section having a distal end which is affixed to the soft flexible stopper, the soft flexible press stopper is circular with a central opening which surrounds a fixed filter which is affixed to the soft flexible press stopper;
  c. movably resting on the fixed filter is a movable flapper valve having a round base sized to fit within the opening of soft flexible press stopper and resting over the filter, the movable flapper valve having a raised section which is aligned with the crossed location of first and second spring leg sections; and
  d. slide able on and affixed adjacent a top portion of the first and second spring leg sections is a sealing member having a multiplicity of liquid flow openings along its outer circumference;
  c. the drinking container having a bottom wall, a sidewall and an open top, the bottom wall having an exterior surface and an interior surface, the sidewall having an exterior surface and an interior surface, the bottom and sidewall interior surfaces surround an interior chamber having an interior diameter from oppositely disposed sections of the interior sidewall surfaces, the soft flexible press stopper having a press fit outer diameter relative the interior diameter of the drinking container, the outer circumference of the sealing member press fit relative to the interior diameter of the drinking container;
  f. whereby, the apparatus as defined in elements a, b, c, and d is used in conjunction with a multiplicity of tea leaves or coffee grinds wherein the tea leaves or coffee grinds are placed into the interior chamber of the drinking container so that the tea leaves or coffee grinds rest on the interior surface of the bottom wall, the interior chamber is filled with hot water, the apparatus is inserted into the interior chamber and pushed down so that first and second spring leg sections cause a bottom surface of the fixed soft flexible press stopper to compress the tea leaves or coffee grinds and because the diameter of the soft flexible press stopper is press fit retained against the interior diameter of the drinking container, the soft flexible press stopper seals off the tea leaves or coffee grinds from the hot water and the pressure of the fixed soft flexible press stopper causes tea or coffee to flow through the filter and the movable flapper value moves toward the crossing point of the first and second spring leg sections and the flat top of the flapper valve comes in contact with the crossing point of the first and second spring leg sections to prevent the movable flapper valve from further rising in the water, but the movement creates an opening above the filter so that the hot water is immersed with tea or coffee, and after the downward pressure on the apparatus is released, the movable flapper valve returns to its position above filter and hot tea or hot coffee is brewed.

17. The apparatus in accordance with claim 16, further comprising:
  a. adding ice to the hot water respectively converts the hot tea or hot coffee into iced tea or iced coffee.

18. The apparatus in accordance with claim 16, further comprising:
  a. the flexible spring leg including the top portion first spring leg section and second spring leg section are made out of material selected from the group consisting of metal including aluminum, steel and titanium and non-metal material including carbon fiber and flexible elastomer plastic.

19. The apparatus in accordance with claim 16, further comprising:
  a. the soft flexible stopper is made out of material selected from the group consisting of silicone and rubber.

20. The apparatus in accordance with claim 16, further comprising:
  a. the movable flapper valve is made out of material selected from the group consisting of silicone and rubber.

* * * * *